United States Patent [19]

Kuwabara et al.

[11] 4,382,745
[45] May 10, 1983

[54] METHOD OF CONTROLLING WICKET GATES OF A PUMP-TURBINE

[75] Inventors: Takao Kuwabara; Hiroshi Okumura, both of Hitachi, Japan

[73] Assignee: Hitachi, Ltd., Tokyo, Japan

[21] Appl. No.: 183,374

[22] Filed: Sep. 2, 1980

Related U.S. Application Data

[63] Continuation of Ser. No. 908,202, May 22, 1978, abandoned.

[30] Foreign Application Priority Data

| May 20, 1977 | [JP] | Japan | 52-59213 |
| May 20, 1977 | [JP] | Japan | 52-59214 |
| Oct. 14, 1977 | [JP] | Japan | 52-122449 |

[51] Int. Cl.³ ............................ F03B 3/10; F03B 15/02
[52] U.S. Cl. ............................................ 415/1; 415/500
[58] Field of Search ...................................... 415/1, 500

[56] References Cited

U.S. PATENT DOCUMENTS

| 3,030,070 | 4/1962 | Krauss | 415/1 |
| 3,063,460 | 11/1962 | Krauss | 415/1 X |
| 3,275,293 | 9/1966 | Hosogai et al. | 415/1 |
| 3,339,567 | 9/1967 | Fukasu et al. | 415/1 X |
| 3,403,888 | 10/1968 | Hartland | 415/1 |
| 3,452,962 | 7/1969 | Willi | 415/1 |
| 3,886,373 | 5/1975 | Okada | 415/1 X |
| 4,014,624 | 3/1977 | Takase et al. | 415/1 |
| 4,073,594 | 2/1978 | Takagi et al. | 415/1 |
| 4,201,925 | 5/1980 | Kuwabara et al. | 415/1 X |
| 4,253,794 | 3/1981 | Kuwabara | 415/1 |

FOREIGN PATENT DOCUMENTS

1503261  5/1970  Fed. Rep. of Germany .......... 415/1

*Primary Examiner*—Everette A. Powell, Jr.
*Attorney, Agent, or Firm*—Thomas E. Beall, Jr.

[57] ABSTRACT

A method of controlling wicket gates of a pump-turbine which prevents abnormal hydraulic pressure variation when load carried on the pump-turbine is removed during the turbine operation thereof. The wicket gates are controlled to open when it is detected that discharge per unit head reduces with the reduction of speed per unit head. When it is once detected that the ratio of variation in the discharge per unit head to the variation in the speed per unit head is reversed from a positive value to a negative value, the wicket gates are closed.

124 Claims, 7 Drawing Figures

TIME

METHOD OF CONTROLLING WICKET GATES OF A PUMP-TURBINE

This is a continuation, of application Ser. No. 908,202, filed May 22, 1978, now abandoned.

LIST OF PRIOR ART REFERENCES (37 CFR 1.56(a))

The following references are cited to show the state of the art:

U.S. Pat. No. 3,452,962, Richard B. Will, Patented July 1, 1969

Japanese Patent Publication No. 40902/74, Motoyasu Morita, Published Nov. 6, 1974

Japanese Laid-Open Patent Publication No. 101646/76, Yoshiyuki Niikura, Laid Open, Sept. 8, 1976

BACKGROUND OF THE INVENTION

1. Field of the Invention

The present invention relates to a pump-turbine and more particularly to a method of controlling the opening and closing of wicket gates of a pump-turbine.

Generally, various components such as runner of a pump-turbine, particularly of a high-head type, are designed to achieve sufficient centrifugal pump action so as to obtain the high-head during pump operation. However, this design badly affects the turbine operation of the pump-turbine. When the performance of the pump-turbine designed in this manner is shown by the performance curve representing the relationship between speed per unit head ($N_1$) and discharge per unit head ($Q_1$) under a predetermined opening of wicket gates, this curve includes in the turbine operation area a first section where the value of $Q_1$ reduces with the increase of the value of $N_1$ and a second section where the value of $Q_1$ reduces with the decrease of the value of $N_1$. For convenience of explanation, the second section will be referred in this specification to "S-section". Further, the pump-turbine performance in the S-section will be hereinafter referred to "S-performance". During the turbine operation in the S-section, the value of torque per unit head ($T_1$) also is reduced as the value of speed power unit head ($N_1$) decreases.

Ordinarily, the turbine operation of the pump-turbine is effected in the abovementioned first section. However, in the case where the speed per unit head ($N_1$) is suddenly increased because of for example a removal or loss of load carried on the pump-turbine, the pump-turbine initiates to operate in the S-section. When the operation in the S-section is initiated, the discharge per unit head ($Q_1$) and speed per unit head ($N_1$) are first reduced tracing the S-section from one end to the other, and thereafter $Q_1$ and $N_1$ are increased tracing the S-section in the opposite direction. This reciprocal tracing on the S-section is repeated nearly endlessly without taking particular measures. Also the torque per unit head ($T_1$) is repeatedly reduced and increased during this pump-turbine operation. It is desired that the pump-turbine operation in the S-section is avoided, since this operation causes in the upstream penstock and the downstream draft tube as well as in the pump-turbine an abnormal hydraulic pressure variation inclusive of large pressure rise and drop with the resultant severe water hammer and even water column separation in an extreme case. It is to be noted that the abovementioned removal of load would occur, when the generator driven by the pump-turbine loses its load due to a failure or burning out of a transformer or such failure of remote facilities on the same transmission line, and that the water hammer is very severe when the penstock or draft tube, or both, is long.

2. Description of the Prior Art

With the ordinary structure, the wicket gates of the pump-turbine are controlled by a governor to rapidly close upon sudden removal of load from the pump-turbine. However, if the rapid closure of the wicket gates is effected and thus the discharge per unit head ($Q_1$) is reduced when the pump-turbine operates tracing the S-section in the $Q_1$-reducing direction, the above-discussed disadvantageous pressure variation will be accelerated. There have been proposed various wicket gate controlling methods intending to overcome such disadvantage by controlling the closure of the wicket gates upon sudden removal of load. However, these methods do not assure that the rapid closure of the wicket gates is effected always at an appropriate timing. It is considered that the prior art methods have been proposed without sufficiently analyzing and understanding the S-performance of the pump-turbine.

SUMMARY OF THE INVENTION

It is therefore an object of the present invention to provide a method of controlling the wicket gates of a pump-turbine of the type exhibiting the S-performance during the turbine operation, which can overcome the disadvantage encountered during the pump-turbine operation according to the prior art controlling methods described hereinbefore.

It is another object of the invention to provide a method of controlling the opening and closing of the wicket gates closely correlated with the pump-turbine performance in the S-section.

It is a further object of the invention to provide a method of controlling the opening and closing of the wicket gates which enables an economical design of the entire hydraulic system incorporating therein the pump-turbine.

In accordance with one aspect of the present invention, a method of controlling the wicket gates of a pump-turbine of the type described comprises the step of temporarily opening the wicket gates while the closure of the wicket gates is being effected upon removal or loss of load from the pump-turbine.

In accordance with another aspect of the invention, a pump-turbine wicket gates controlling method comprises the step of either restricting the closure of the wicket gates or opening the latter when it is detected that the pump-turbine operates tracing the S-section in the $Q_1$-reducing direction.

If it is detected that the pump-turbine operates tracing the S-section in the $Q_1$-increasing direction, the opening of the wicket gates should be restricted. Preferably, the wicket gates are closed when the latter condition is detected.

The foregoing objects and other objects as well as the characteristic features of the invention will become more apparent by the following description when read in conjunction with the accompanying drawings.

DETAILED DESCRIPTION OF THE INVENTION

Before entering into detailed discussion of the invention, the pump-turbine performance and the prior art wicket gate controlling methods will be described with reference to FIGS. 1A and 1B, and FIGS. 2A to 2D.

Figure 1A:
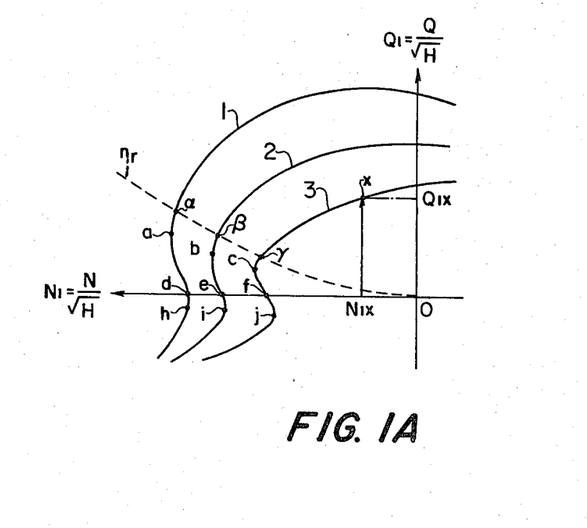
FIGS. 1A and 1B graphically illustrate the performance of a pump-turbine of the type which exhibits the S-performance during turbine operation.
Figure 1B:
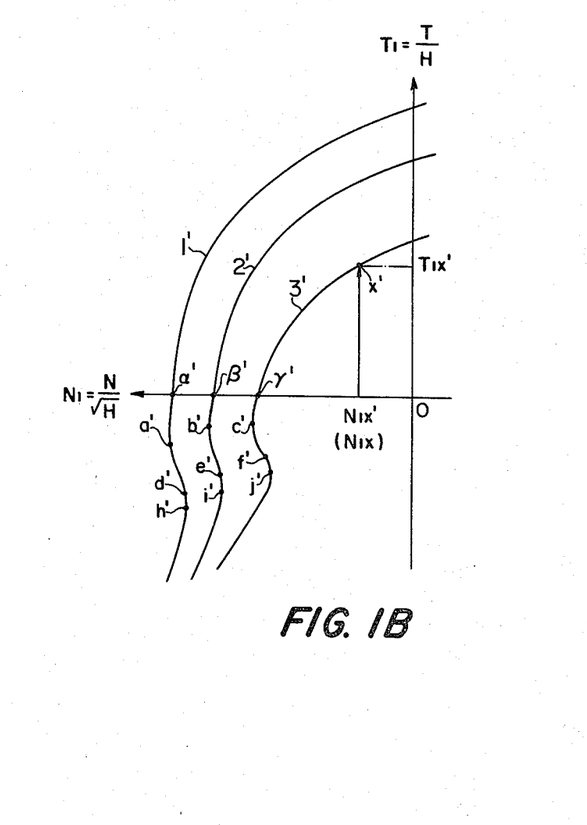

The performance of a pump-turbine exhibiting S-performance during the turbine operation is illustrated in FIGS. 1A and 1B. FIG. 1A illustrates the pump-turbine performance as the relationship between speed per unit head ($N_1$) and discharge per unit head ($Q_1$) with the wicket gate opening used as a parameter, while FIG. 1B illustrates the performance as the relationship between the speed per unit head ($N_1$) and torque per unit head ($T_1$) utilizing the same parameter. $N_1$, $Q_1$ and $T_1$ are represented by the following equations:

$$N_1 = N/\sqrt{H}, Q_1 = Q/\sqrt{H}, \text{ and } T_1 = T/H.$$

In these equations, characters N, Q, H and T designate rotation speed of the pump-turbine, hydraulic flow rate through the pump-turbine, the pump-turbine effective head and the pump-turbine torque, respectively.

Performance curves 1 and 1' are obtained with a predetermined comparatively large opening of wicket gates, and performance curves 2 and 2' are obtained by making the wicket gate opening smaller. Further, performance curves 3 and 3' represent the pump-turbine performance obtained with further reduced wicket gate opening. On the section a-d-h of the performance curve 1, the value of $Q_1$ is reduced with the decrease of the value of $N_1$. As stated above, this curve section a-d-h is referred to in this specification as of "S-section". Similarly, the curve sections b-e-i and c-f-j also are S-sections of the performance curves 2 and 3, respectively. As can be seen, the S-section a-d-h of the performance curve 1 is larger in length than the S-section b-e-i of the performance curve 2, and the S-section b-e-i of the performance curve 2 has a larger length than the S-section c-f-j of the performance curve 3. This means that the length of the S-section is reduced when the opening of the wicket gates is reduced.

Also in FIG. 1B, as in FIG. 1A, the curve sections a'-d'-h', b'-e'-i' and c'-f'-j' are S-sections of the performance curves 1', 2' and 3', respectively.

FIG. 1B has close relation to FIG. 1A. For example, the point x on the curve 3 in FIG. 1A, which satisfies the equations $Q_1=Q_{1x}$ and $N=N_{1x}$, corresponds to the point x' on the curve 3' in FIG. 1B. The point x' satisfies the equations $T_1=T_{1x'}$, and $N_1=N_{1x'}(=N_{1x})$. Similarly the points a, b, c, d, e, f, g, h, i and j in FIG. 1A correspond to the points a', b', c', d', e', f', g', h', i' and j' in FIG. 1B, respectively.

The curve $n_r$ is the no load discharge line. The points α, β and γ, which are the intersections of the curves 1, 2, 3 and the curve $n_r$, correspond to the points α', β' and γ', which are the intersections of the curves 1', 2', 3' and the line $T_1=0$.

Hereinafter, the turbine operation, i.e., the electric power generating operation of the pump turbine will be described with reference to the performance curves 1 and 1'.

As stated before, the characteristic corresponding to the curves 1 and 1' is obtained by selecting a comparatively large opening of the wicket gates. Ordinarily, the turbine operation of the pump-turbine is effected on the upper curve section of the performance curve 1, i.e., on the curve section having higher $Q_1$ and higher $T_1$ values than the S-section a-d-h. However, if, for example, the load imposed on the pump-turbine is suddenly removed, the value of $N_1$ is suddenly increased drastically because of the sudden increase of the pump-turbine rotation (N). Thus, the pump-turbine operation is shifted to the S-section. During the operation in the S-section, when the value of $N_1$ is reduced due to the decrease of the pump-turbine rotation (N), the value of $Q_1$ also is reduced. The reduction of the value of $Q_1$ means that the flow rate (Q) through the pump-turbine is correspondingly reduced, provided that the value of pump-turbine effective head H is constant. Actually, the value of H, which is represented by the difference in head between the inlet side of the pump-turbine connected to a penstock and the outlet side thereof connected to a draft tube, is increased as the flow rate Q reduces. Thus, once the value of $N_1$ is reduced, the flow rate Q is reduced, and the reduction of the flow rate Q causes the increase of pump-turbine effective head H. This increase in the effective head H further decreases the value of $N_1$, which in turn causes further decrease of $Q_1$. Thus, once the operation in the S-section is commenced, $Q_1$ and $N_1$ are acceleratingly and continuously reduced tracing the S-section in the $Q_1$-reducing direction, i.e., from the point a to point h. It will be understood that $Q_1$ and $N_1$ are acceleratingly and continuously reduced in the same manner as a positive feed-back control circuit.

After the trace on the S-section from the point a to the point h is finished, the above-stated phenomenon is gradually decelerated as in the case of a negative feedback, and thereafter the trace on the S-section is reversed in the $Q_1$-increasing direction, i.e., from the point h to point a. The trace in this direction is effected also in the same manner as the positive feed-back control circuit.

The above-discussed reciprocal tracing is almost endlessly and continuously repeated during the pump-turbine operation in the S-section. As previously explained, this operation is undesirable since it causes an abnormal hydraulic pressure variation in the hydraulic systems of a power station accompanying a heavy water hammer and, occasionally, a water column separation. It is to be noted that the adverse effects caused during the pump-turbine operation in the S-section are suppressed if the length of the S-section is reduced. For example, if the wicket gate opening is reduced to obtain the performance curve 2 having the S-section b-e-i of the reduced length, the adverse effects are alleviated.

The pump-turbine operation in the S-section badly affects the pump-turbinwe torque T also. When the value of $N_1$ is reduced in the S-section, the value of $T_1$ is reduced as shown in FIG. 1B. It is to be noted here that the points a and h of the performance curve 1 shown in FIG. 1A correspond to the points a' and h' of the performance curve 1' in FIG. 1B. The reduction of the value of $T_1$ means that the pump-turbine torque T is reduced, provided that the pump-turbine effective head H is constant. Further, it is apparent that the reduction in the pump-turbine torque T causes the reduction in the pump-turbine rotation N. When the pump-turbine rotation N is reduced, the value of $N_1$ will be correspondingly reduced, which in turn causes the furthwer reduction of $T_1$. Actually since there is an increase of effective head H during this period as mentioned above, this accelerating tendency is further promoted. Thus, while the S-section of the performance curve 1 is traced in the $Q_1$-reducing direction, the performance curve 1' is traced from the point a' to point h' in the same manner as a positive feed-back control circuit. Further, as the tracing direction on the S-section is reversed, the performance curve 1' is traced from the point h' to point a'. Apparently, the abovementioned torque variation is disadvantageous and should be avoided or minimized.

Figure 2A:
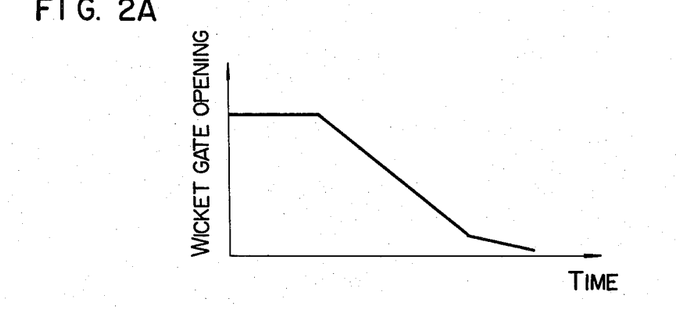
FIGS. 2A to 2D schematically illustrate the prior art methods of controlling the wicket gates of the pump-turbine upon sudden removal of load from the latter.
Figure 2B:
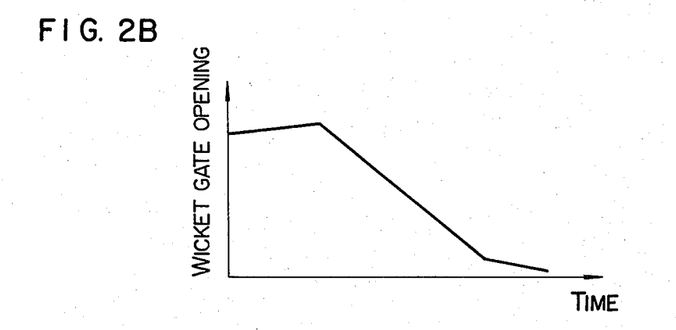

FIGS. 2A to 2D are schematic views showing the prior art methods of controlling the wicket gates upon removal of load from the pump-turbine. In these figures, the prior art methods are schematically illustrated as relationships between the wicket gate opening and the time lapse after the load is removed. The wicket gates are ordinarily controlled by a governor in the pump-turbine to close upon removal of load. The method of FIG. 2A is directed to prevent the governor from closing the wicket gates for a predetermined time period after the load has been removed. More particularly, the wicket gates are maintained to have a constant opening for the predetermined time and thereafter rapidly closed. In the method of FIG. 2B, the wicket gates are first slowly opened and thereafter rapidly closed. These methods are defective in the following points.

The pump-turbine operation tracing the S-section is not initiated until the speed per unit head ($N_1$) is increased to reach the point a in FIG. 1A, even when the load has been removed. Thus, the operation in the S-section is initiated after lapse of a predetermined time period from the removal of load. It is preferable that the wicket gates are rapidly closed during the latter time period, as contrasted to the methods of FIGS. 2A and 2B, since the pump-turbine performance may be transferred by this rapid closure to reduce the adverse effects caused in the S-section. For example, the performance which had been represented by the performance curve 1 in FIG. 1A may be transferred by the closure of the wicket gates to the performance represented by the performance curve 2. The performance curve 2 has the S-section which is smaller in length than the S-section of the performance curve 1, so that the adverse effects in question can be reduced by this transfer. The methods of FIGS. 2A and 2B are not preferable from this standpoint. It is further to be noted that the rapid closure should not be made when the pump-turbine operation is effected tracing the S-section in the $Q_1$-reducing direction, so as to prevent that the tracing is accelerated because of the reduction of for example $Q_1$ and $N_1$ caused by this closure. The methods of FIGS. 2A and 2B are dangerous since the timing of effecting the rapid closure of the wicket gates is indefinite. If the rapid closure is effected during the pump-turbine operation tracing the S-section in the $Q_1$-increasing direction, these methods will be advantageous to some extent. If however it is effected while the S-section is being traced in the $Q_1$-reducing direction, the adverse effects at the S-section will be largerly dangerously accelerated.

The opportunity that the rapid closure is effected during the pump-turbine operation tracing the S-section in the $Q_1$-reducing direction is not limited to a predetermined time period after the removal of load, but occurs repeatedly. This every opportunity should be avoided to prevent the disadvantageous abnormal pressure variation.

Figure 2C:
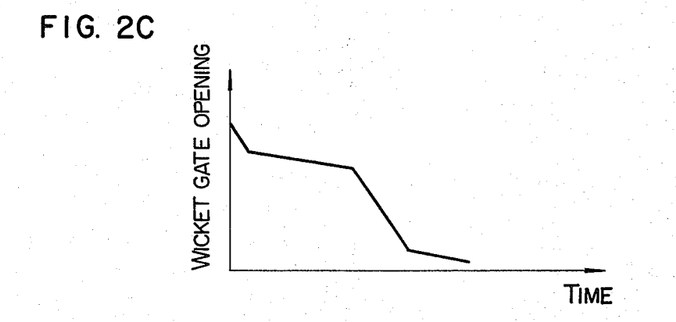

The method of FIG. 2C is disclosed in Japanese Patent Publication No. 40902/74. In this method, the wicket gates are first rapidly closed upon sudden removal of load, in turn slowly closed during the turbine operation area where hydraulic flow rate through the pump-turbine is largerly reduced with the increase of the pump-turbine rotation, and in turn rapidly closed. This method has the defect that the timing of effecting the final rapid closure step is not definitely determined. If this rapid closure is effected during the turbine operation tracing the S-section in the $Q_1$-reducing direction, dangerous situation as described above would occur. Further, in the case where one hydraulic line extending across one pump-turbine and another hydraulic line extending across another pump-turbine are connected at the upstream end to a common penstock and at the downstream end to a common draft tube, operation of one of the pump-turbines is affected by the operation of the other. In this case, there is some possibility that, even if load has not been removed from one of the pump-turbines, this pump-turbine may operate near the S-section under influence of for example a water hammer caused by the other pump-turbine. If the first rapid closure step in FIG. 2C is performed on the abovementioned one of the pump-turbines which operates near the S-section, there is a fear that the rapid closure of wicket gates will be effected while this pump-turbine operates in the S-section in the $Q_1$-reducing direction.

Figure 2D:
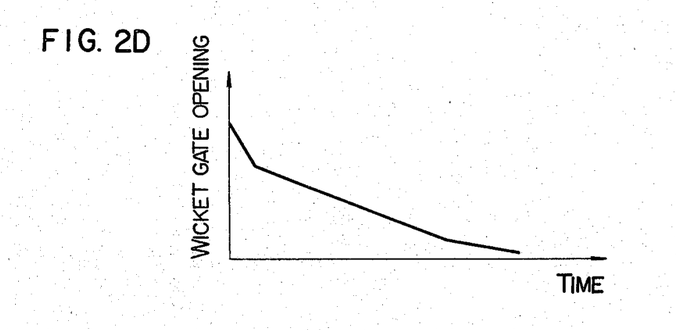

In the method of FIG. 2D, closure of the wicket gates is effected in two steps. Also this method is defective because of the timing of effecting the closure steps which are not definitely determined.

As described above, the prior art methods have the common defect that the timing of effecting the closure of wicket gates is not determined under full consideration of the S-performance. In order to avoid the disadvantageous abnormal pressure variation, it is necessary to control the wicket gates such that the rapid closure thereof is not effected while the pump-turbine operates tracing the S-section in the $Q_1$-reducing direction. It will also be understood that wicket gates should not be opened while the S-section is traced in the $Q_1$-increasing direction.

The inventors of the present invention conducted the analysis of the S-performance given hereinbefore, and found that preferable result can be obtained by the wicket gates controlling methods described hereunder.

First of all, the inventors have found that, in order to prevent the adverse effects in the S-section upon removal or loss of load, it is effective to temporarily open the wicket gates while the closure of the wicket gates are being effected. This temporary opening of the wicket gates may be effected when it is detected that the wicket gates are closed to a predetermined opening. Alternatively, the temporary opening may be effected when a predetermined time period has elapsed after the removal or loss of load. In the case where the controlling method includes the first step of maintaining the wicket gates to have a constant opening as similar to the method of FIG. 2A, the temporary opening of the wicket gates may be effected during this first step. Similarly, in the case where the controlling method includes the first step of slowly opening the wicket gates before the rapid closure of the latter, as in the method of FIG.

2B, the temporary opening may be effected during this first step.

In order to prevent that the tracing on the S-section in the $Q_1$-reducing direction is accelerated, it is at least necessary to prevent the wicket gates from effecting the rapid closure during this tracing. It is however more preferable that the opening of the wicket gates is effected when the turbine operation tracing the S-section in the $Q_1$-reducing direction is detected. As will be understood from FIGS. 1A and 1B, when the pump-turbine operation is effected tracing the S-section, the relationships, $\partial Q_1/\partial N_1 > 0$ and $\partial T_1/\partial N_1 > 0$, are satisfied. In the case where the S-section is traced in the $Q_1$-reducing direction, both of the relationships $dN_1/dt < 0$ and $dQ_1/dt < 0$ are satisfied, wherein t indicates time. If the relationship $dQ_1/dt < 0$ is satisfied, the relationship $dP/dt > 0$ also should be satisfied (P indicating the pressure in the penstock). Thus, the detection of the pump-turbine operation tracing the S-section can be effected utilizing the above-mentioned various relations. More particularly, the pump-turbine operation tracing the S-section in the $Q_1$-reducing direction can be detected by detecting that any one of the following three conditions is satisfied.

(A) $dN_1/dt < 0$, and $dQ_1/dt < 0$;
(B) $dN_1/dt < 0$, and $dP/dt > 0$; and
(C) $dT_1/dt < 0$, and $dN_1/dt < 0$.

For the precise detection on this pump-turbine operation, it is preferable to detect that any one of the above-listed conditions A to C is satisfied. For the purpose of the invention, however, the conditions A to C may be replaced by the following conditions A' to C'.

(A') $dN_1/dt <$ a value near zero, and $dQ_1/dt <$ a value near zero;
(B') $dN_1/dt <$ a value near zero, and $dP/dt >$ a value near zero
(C') $dT_1/dt <$ a value near zero, and $dN_1/dt <$ a value near zero.

Similarly, the hereinafter explained formula, $d^2N/dt^2 < 0$ may be replaced by $d^2N/dt^2 <$ a value near zero.

The applicants' have shown that substantially accurate detection can be effected even when $dN/dt$, $dQ/dt$ and $dT/dt$ are substituted for $dN_1/dt$, $dQ_1/dt$ and $dT_1/dt$, respectively. This substitution can be attained by assuming that the pump-turbine effective head (H) is constant. It will be understood that the detection of the pump-turbine operation tracing the S-section may be made from the other factors. For example, it may be effected by detecting that certain relationships are satisfied among the factors raised in any one of the items given below:

(1) Pump-turbine rotation (N), pump-turbine effective head (H), pump-turbine output or pump-turbine torque (T), and opening of wicket gates (Y);
(2) H, pump-turbine output, and Y (the detection from these factors being able to be made for example under condition that the pump-turbine is in tie-line operation and it can be expected that N is maintained substantially constant);
(3) Pump-turbine output and if necessary Y (under same condition as item (2) above);
(4) $\partial T_1/\partial N_1$ and if necessary Y;
(5) $dT/dt$, $dN_1/dt$ and if necessary Y;
(6) $dT/dt$, $dH/dt$ and if necessary Y (under same condition as item (2) above);
(7) N, H, Q and Y;
(8) H, Q and Y (under same condition as item (2));
(9) $\partial Q_1/\partial N_1$ and if necessary Y;
(10) $dQ/dt$, $dN_1/dt$ and if necessary Y;
(11) $dQ/dt$, $dH/dt$ and if necessary Y (under same condition as item (2));
(12) N, H and Y (when it can be expected that pump-turbine output or Q is substantially constant); and
(13) $d^2N/dt^2$, $dN/dt$ and if necessary Y.

It is desirable that the detection is effected from only the pump-turbine rotation (N) as in item (13) above, since the variation in the pump-turbine rotation during the pump-turbine operation is smooth and can be preferably easily detected. Ordinarily, the detection of H, Q and T cannot be effected with high accuracy. The applicants have found that the detection on the pump-turbine operation tracing the S-section in the $Q_1$-reducing direction can be made by detecting that both of the two relationships, $dN/dt < 0$ and $d^2N/dt^2 < 0$ are satisfied. These relationships have been attained by the following analysis.

Figure 3:
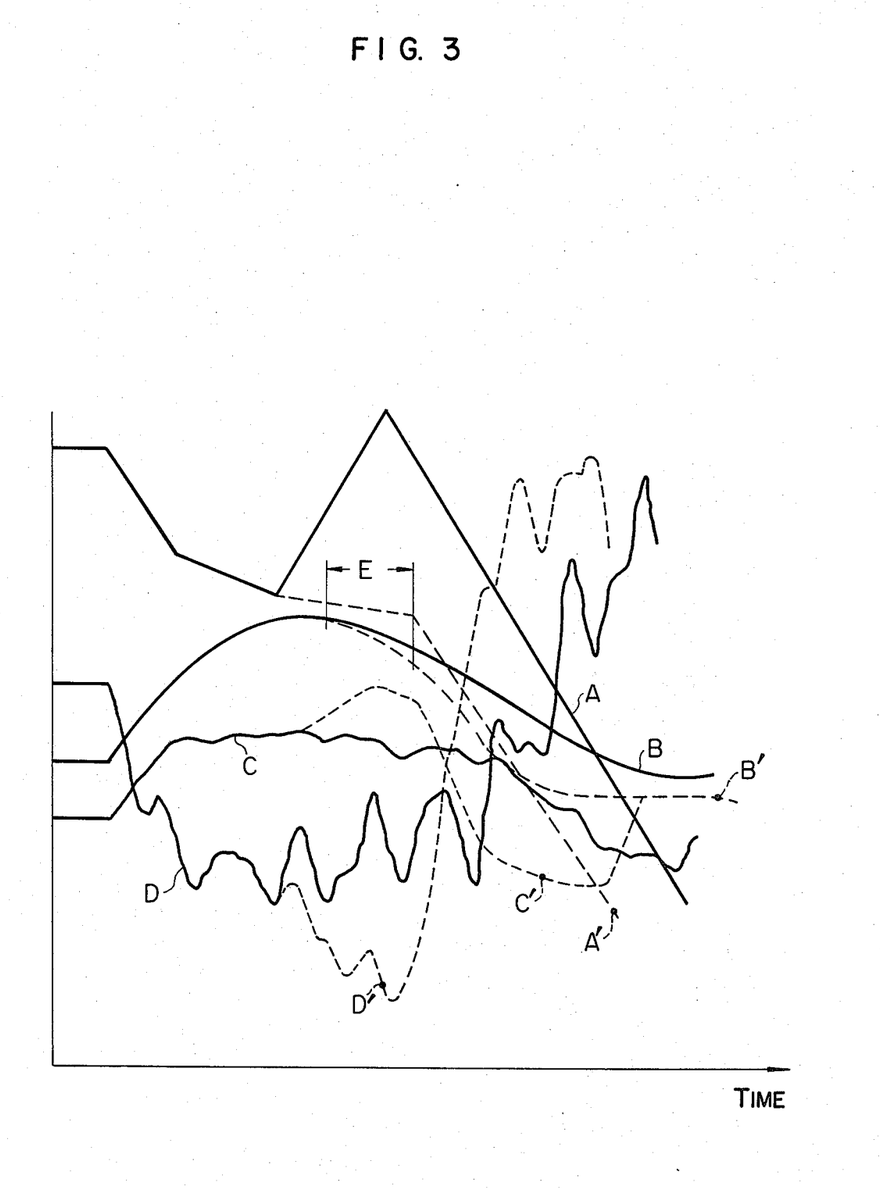
FIG. 3 graphically illustrates one example of a wicket gate controlling method according to the invention in comparison with a prior art method.

In the case where the S-section is traced in the $Q_1$-reducing direction, the relationships, $dN_1/dt < 0$ and $dT_1/dt < 0$, are satisfied as previously described. The formulae, $dN_1/dt < 0$ and $dT_1/dt < 0$, may be replaced by $dN/dt < 0$ and $dT/dt < 0$, respectively, assuming that H is constant. As is well-known, the torque T may be designated by the equation, $I \cdot dN/dt = kT$, wherein I and k indicate moment of inertia and positive constant number, respectively. To differentiate by time t the left and right terms of the above equation, the equation, $$d^2N/dt^2 = k' \frac{dT}{dt}$$

is obtained, wherein k' indicates positive constant number. Thus, the relationship, $dT_1/dt < 0$, can be rewritten into the relationship, $d^2N/dt^2 < 0$, which indicates that the variation curve of N is convex toward the upside (Refer to curves B and B' in FIG. 3.). It will thus be understood that, when the S-section is traced in the $Q_1$-reducing, i.e., $N_1$ or N-reducing direction, both of the relationships, $dN/dt < 0$ and $d^2N/dt^2 < 0$, are satisfied (Refer to E in FIG. 3.). It is preferred that the wicket gates are opened as soon as both of the above relationships are satisfied.

As will be understood from the previous discussion, the formulae, $dN/dt < 0$ and $d^2N/dt^2 < 0$, may be replaced by $dN/dt <$ a value near zero and $d^2N/dt^2 <$ a value near zero. Alternatively, temporary opening of the wicket gates may be effected when the pump-turbine rotation (N) reaches a maximum value after removal of load.

Next, the discussion will be made to the case where the S-section is traced in the $Q_1$-increasing direction. During this pump-turbine operation, it is necessary to prevent the wicket gates from being opened, so as to prevent that the tracing on the S-section in this direction is accelerated. Thus, when the tracing on the S-section in the $Q_1$-reducing direction is terminated, or when the tracing on the same section in the $Q_1$-increasing direction is initiated, the opening of the wicket gates should be restricted or inhibited. More preferably, the wicket gates are closed at this stage. It is preferable that this closure of the wicket gates is effected as rapidly as possible. The termination of the tracing on the S-section in the $Q_1$-reducing direction can be easily detected since the abovementioned relationships are not satisfied at this stage. Of course it is possible to positively detect that the tracing in the $Q_1$-increasing direction is effected. It will be understood that the detection of the latter operation is effected for example by detecting that the relationships, $dQ_1/dt>0$ and is satisfied.

Upon removal of load, the rate of variation in $Q_1$ with respect to the rate of variation in $N_1$ is increased from a negative value to an enormous negative value ($\partial Q_1/\partial N_1$ being increased to the negative direction) when the pump-turbine operation approaches to the S-section, as will be apparent from FIG. 1A. If slow closure of the wicket gates is initiated in the S-section, $\partial Q_1/\partial N_1$ is prevented from taking very low positive values, and this slow closure is continued while the S-section is being traced in the $Q_1$-reducing direction, the acceleration of the tracing on the S-section in the latter direction may be reduced particularly as compared with the case where rapid closure of the wicket gates is effected at this stage. Preferably, the wicket gates are forcibly opened when the abovementioned condition is detected, and this opening of the wicket gates is continued until the tracing on the S-section in the $Q_1$-reducing direction is terminated. In both of the above cases, the wicket gates should be closed (preferably, rapidly closed) when it is detected that the relation $\partial Q_1/\partial N_1>0$ is reversed to $\partial Q_1/\partial N_1>0$ after the tracing down along the S-curve has been completed (i.e., when it is detected that the pump-turbine operation escaped from the S-section), so that the tracing on the S-section will never be experienced in the swing-back process in the $Q_1$-increasing direction by preventing $\partial Q_1/\partial N_1<0$ to take positive values owing to the dynamic modification effect on the S-curve caused by the closing motion.

The forcible control of the opening and closing of the wicket gates in accordance with the invention may be effected for example by providing means for forcibly controlling a pressure distributing valve of a servo motor for the wicket gates.

FIG. 3 exemplarily illustrates the method of the present invention as compared with the prior art method. The FIG. 3 graph was obtained by a computer simulation conducted by the applicants. In this graph, the method of the invention is shown by solid lines A to D which represent opening of the wicket gates, pump-turbine rotation, hydraulic pressure in the penstock and the hydraulic pressure in the draft tube, respectively, while the prior art method is shown by dotted lines A' to D' which represent wicket gate opening, pump-turbine rotation, hydraulic pressure in the penstock and the hydraulic pressure in the draft tube, respectively. The abscissa of this graph shows the time lapse from the removal of load. As can be seen, in the illustrated prior art method, the hydraulic pressure in the penstock reaches a maximum value after the maximum pump-turbine rotation is attained, and that the maximum value on the penstock pressure is obtained while the S-section is being traced in the $Q_1$-reducing direction or at the time when the tracing on the S-section in this direction is nearly terminated. It should be noted here that character E designates the area where the tracing on the S-section in the $Q_1$-reducing direction is effected. In the illustrated method of the invention, the wicket gates are opened in the area E and thereafter closed. It can be seen that the hydraulic pressure variations in the penstock and the draft tube, particularly abrupt pressure rise and drop in the penstock as well as abrupt pressure drop in the draft tube, can be advantageously prevented with the method of the invention.

As described above, the disadvantageous abnormal hydraulic pressure variation can be avoided according to the invention. The prevention of such pressure variation brings about an advantage that the pump-turbine as well as the entire hydraulic system can be economically designed. Further, since the possibility of occurance of the water column separation at the downstream side is eliminated because of the prevention of the abnormal pressure drop at this side, the draft head of the pump-turbine can be reduced. This contributes to the economical construction of the entire power plant.

What is claimed is:

1. In a method of controlling wicket gates of a pump-turbine upon removal of load from said pump-turbine, said pump-turbine being of the type having in the turbine operation area S-section where discharge per unit head ($Q_1$) and speed per unit head ($N_1$) satisfy the relationship, $\partial Q_1/\partial N_1>0$, the improvement which comprises the steps of slowly closing said wicket gates when the ratio ($\partial Q_1/\partial N_1$) of variation of the discharge per unit head to the speed per unit head is reduced than a predetermined negative value, continuing the slow closure of said wicket gates while said pump-turbine operates tracing said S-section, and rapidly closing said wicket gates as soon as the ratio, $\partial Q_1/\partial N_1$, is once reversed from a positive value out of said S-section to a negative value.

2. In a method of controlling wicket gates of a pump-turbine upon removal of load from said pump-turbine, said pump-turbine being or the type having in the turbine operation area S-section where discharge per unit head ($Q_1$) and speed per unit head ($N_1$) satisfy the relationship, $\partial Q_1/\partial N_1>0$, the improvement which comprises the steps of forcibly opening said wicket gates when the ratio ($\partial Q_1/\partial N_1$) of variation of the discharge per unit head to the speed per unit head is reduced than a predetermined negative value, continuing the forcible opening of said wicket gates while said pump-turbine operates tracing said S-section, and rapidly closing said wicket gates as soon as the ratio, $\partial Q_1/\partial N_1$, is once reversed from a positive value out of said S-section to a negative value.

3. In a method of controlling wicket gates of a pump-turbine of the type which has in the turbine operation area S-section where discharge per unit head (Q1) and speed per unit head ($N_1$) satisfy the relationship, $\partial Q_1/\partial N_1>0$, the improvement which comprises the steps of opening said wicket gates when the turbine operation of said pump-turbine is effected on the S-section upon removal of load from said pump-turbine, and, when said pump-turbine operates outside said S-section, closing said wicket gates as rapidly as possible under condition that the hydraulic pressure variation caused by the rapid closure of said wicket gates becomes substantially equal to the hydraulic pressure variation caused in the S-section.

4. A method of controlling the wicket gates of a pump-turbine to prevent abnormal pressure rises when load carried by the pump-turbine is removed during the turbine operation, with respect to a turbine having wicket gates closable and openable to control the flow of fluid through the turbine impeller and having a S-section of its performance as a turbine defined by $\partial Q_1/\partial N_1>0$, wherein $Q_1$ is the discharge fluid through the impeller per unit head and $N_1$ is the impeller speed per unit head, comprising the steps of:

upon removal of load from the pump-turbine, reducing $Q_1$ and approaching the S-section;

thereafter opening the wicket gates within the S-section; and thereafter closing the wicket gates.

5. The method of claim 4, including the further steps of detecting when the pump-turbine is operating within the S-section so that the discharge per unit head $Q_1$ is decreasing and conducting said step of opening when $Q_1$ is decreasing.

6. The method of claim 5, further including the step of detecting when the discharge per unit head $Q_1$ is increasing within the S-section and conducting said last mentioned step of closing in the S-section when the discharge per unit head $Q_1$ is increasing.

7. The method of claim 4, wherein the turbine impeller speed N is detected, and said step of opening is conducted when the impeller speed with respect to time satisfies both of the relationships that $dN/dt < 0$ and $d^2N/dt^2 < 0$, wherein t is time.

8. The method of claim 7, further including the step of detecting when the discharge per unit head $Q_1$ is increasing within the S-section and conducting said last mentioned step of closing in the S-section when the discharge per unit head $Q_1$ is increasing.

9. The method of claim 4, further including the step of detecting when the discharge per unit head $Q_1$ is increasing within the S-section and conducting said last mentioned step of closing in the S-section when the discharge per unit head $Q_1$ is increasing.

10. The method of claim 4, wherein the turbine further has the characteristic of operating either above its no load discharge line or below its no load discharge line, and said steps of opening and last mentioned closing are conducted in operation below said no load discharge line.

11. A method according to claim 4, wherein the turbine has a penstock providing fluid under pressure to the wicket gates, further comprising the steps of:

detecting the hydraulic pressure P within the penstock;

detecting the speed of rotation N of the impeller; and conducting said closing step when $dP/dt < 0$, and $dN/dt < 0$, wherein t is time.

12. A method according to claim 4, further including the steps of:

detecting the speed of rotation of the impeller N;

detecting the torque T produced by turbine operation; and conducting said step of opening when $dT/dt < 0$ and $dN/dt < 0$.

13. The method of claim 4, further comprising the steps of:

rapidly closing the wicket gates when it is detected that the ratio $\partial Q_1/\partial N_1$ changes from a positive value to a negative value indicating that operation within the S-section has terminated.

14. The method of claim 4, wherein the turbine has a penstock providing fluid under pressure to the wicket gates, further comprising the steps of:

detecting the hydraulic pressure P within the penstock;

detecting the speed of rotation N of the impeller;

conducting said opening step when $dP/dt > 0$, and $dN/dt < 0$, wherein t is time.

15. The method of claim 14, wherein the turbine has a penstock providing fluid under pressure to the wicket gates, further comprising the steps of:

detecting the hydraulic pressure P within the penstock;

detecting the speed of rotation N of the impeller; and conducting said closing step when $dP/dt < 0$, and $dN/dt < 0$, wherein t is time.

16. The method of claim 4, including discontinuing said opening of the wicket gates when $\partial Q_1/\partial N_1 < 0$.

17. The method of claim 16, including the further steps of detecting when the pump-turbine is operating within the S-section so that the discharge per unit head $Q_1$ is decreasing and conducting said step of opening when $Q_1$ is decreasing.

18. The method of claim 4, wherein said step of reducing partially closes the wicket gates.

19. The method of claim 18, including the further steps of detecting when the pump-turbine is operating within the S-section so that the discharge per unit head $Q_1$ is decreasing and conducting said step of opening when $Q_1$ is decreasing.

20. The method of claim 19, further including the step of detecting when the discharge per unit head $Q_1$ is increasing within the S-section and conducting said last mentioned step of closing in the S-section when the discharge per unit head $Q_1$ is increasing.

21. The method of claim 18, wherein the turbine impeller speed N is detected, and said step of opening is conducted when the impeller speed with respect to time satisfies both of the relationships that $dN/dt < 0$ and $d^2N/dt^2 < 0$, wherein t is time.

22. The method of claim 21, further including the step of detecting when the discharge per unit head $Q_1$ is increasing within the S-section and conducting said last mentioned step of closing in the S-section when the discharge per unit head $Q_1$ is increasing.

23. The method of claim 18, further including the step of detecting when the discharge per unit head $Q_1$ is increasing within the S-section and conducting said last mentioned step of closing in the S-section when the discharge per unit head $Q_1$ is increasing.

24. The method of claim 18, wherein the turbine further has the characteristic of operating either above its no load discharge line or below its no load discharge line, and said steps of opening and last mentioned closing are conducted in operation below said no load discharge line.

25. The method of claim 18, wherein the turbine has a penstock providing fluid under pressure to the wicket gates, further comprising the steps of:

detecting the hydraulic pressure P within the penstock;

detecting the speed of rotation N of the impeller; and conducting said closing step when $dP/dt < 0$, and $dN/dt < 0$, wherein t is time.

26. The method of claim 18, further including the steps of:

detecting the speed of rotation of the impeller N;

detecting the torque T produced by turbine operation; and conducting said step of opening when $dT/dt < 0$ and $dN/dt < 0$.

27. The method of claim 18, further comprising the steps of:

rapidly closing the wicket gates when it is detected that the ratio $\partial Q_1/\partial N_1$ changes from a positive value to a negative value indicating that operation within the S-section has terminated.

28. The method of claim 18, wherein the turbine has a penstock providing fluid under pressure to the wicket gates, further comprising the steps of:
  detecting the hydraulic pressure P within the penstock;
  detecting the speed of rotation N of the impeller; and
  conducting said opening step when $dP/dt>0$, and $dN/dt<0$, wherein t is time.

29. The method of claim 28, wherein the turbine has a penstock providing fluid under pressure to the wicket gates, further comprising the steps of:
  detecting the hydraulic pressure P within the penstock;
  detecting the speed of rotation N of the impeller; and
  conducting said closing step when $dP/dt<0$, and $dN/dt<0$, wherein t is time.

30. The method of claim 18, discontinuing opening of the wicket gates when $\partial Q_1/\partial N_1<0$.

31. The method of claim 30, including the further steps of detecting when the pump-turbine is operating within the S-section so that the discharge per unit head $Q_1$ is decreasing and conducting said step of opening when $Q_1$ is decreasing.

32. The method of claim 21, wherein the turbine further has the characteristic of operating either above its no load discharge line or below its no load discharge line, and said steps of opening and last mentioned closing are conducted in operation below said no load discharge line.

33. The method of claim 32, wherein the turbine has a penstock providing fluid under pressure to the wicket gates, further comprising the steps of:
  detecting the hydraulic pressure P within the penstock;
  detecting the speed of rotation N of the impeller; and
  conducting said closing step when $dP/dt<0$, and $dN/dt<0$, wherein t is time.

34. The method of claim 32, further comprising the steps of:
  rapidly closing the wicket gates when it is detected that the ratio $\partial Q_1/\partial N_1$ changes from a positive value to a negative value indicating that operation within the S-section has terminated.

35. The method of claim 32, including discontinuing said opening of the wicket gates when $\partial Q_1/\partial N_1<0$.

36. The method of claim 18, wherein said step of closing closes the wicket gates at a rate at least as great as said step of reducing.

37. The method of claim 36, including the further steps of detecting when the pump-turbine is operating within the S-section so that the discharge per unit head $Q_1$ is decreasing and conducting said step of opening when $Q_1$ is decreasing.

38. The method of claim 37, further including the step of detecting when the discharge per unit head $Q_1$ is increasing within the S-section and conducting said last mentioned step of closing in the S-section when the discharge per unit head $Q_1$ is increasing.

39. The method of claim 36, wherein the turbine impeller speed N is detected, and said step of opening is conducted when the impeller speed with respect to time satisfies both of the relationships that $dN/dt<0$ and $d^2N/dt^2<0$, wherein t is time.

40. The method of claim 39, further including the step of detecting when the discharge per unit head $Q_1$ is increasing within the S-section and conducting said last mentioned step of closing in the S-section when the discharge per unit head $Q_1$ is increasing.

41. The method of claim 36, further including the step of detecting when the discharge per unit head $Q_1$ is increasing within the S-section and conducting said last mentioned step of closing in the S-section when the discharge per unit head $Q_1$ is increasing.

42. The method of claim 36, wherein the turbine further has the characteristic of operating either above its no load discharge line or below its no load discharge line, and said steps of opening and last mentioned closing are conducted in operation below said no load discharge line.

43. The method of claim 36, wherein the turbine has a penstock providing fluid under pressure to the wicket gates, further comprising the steps of:
  detecting the hydraulic pressure P within the penstock;
  detecting the speed of rotation N of the impeller; and
  conducting said closing step when $dP/dt<0$, and $dN/dt<0$, wherein t is time.

44. The method of claim 36, further including the steps of:
  detecting the speed of rotation of the impeller N;
  detecting the torque T produced by turbine operation; and
  conducting said step of opening when $dT/dt<0$ and $dN/dt<0$.

45. The method of claim 36, further comprising the steps of:
  rapidly closing the wicket gates when it is detected that the ratio $\partial Q_1/\partial N_1$ changes from a positive value to a negative value indicating that operation within the S-section has terminated.

46. The method of claim 36, wherein the turbine has a penstock providing fluid under pressure to the wicket gates, further comprising the steps of:
  detecting the hydraulic pressure P within the penstock;
  detecting the speed of rotation N of the impeller; and
  conducting said opening step when $dP/dt>0$, and $dN/dt<0$, wherein t is time.

47. The method of claim 46, wherein the turbine has a penstock providing fluid under pressure to the wicket gates, further comprising the steps of:
  detecting the hydraulic pressure P within the penstock;
  detecting the speed of rotation N of the impeller; and
  conducting said closing step when $dP/dt<0$, and $dN/dt<0$, wherein t is time.

48. A method of controlling the wicket gates of a pump-turbine to prevent abnormal pressure rises when load carried by the pump-turbine is removed during the turbine operation, with respect to a turbine having wicket gates closable and openable to control the flow of fluid through the turbine impeller and having an S-section of its performance as a turbine defined by $\partial Q_1/\partial N_1>0$, wherein $Q_1$ is the discharge fluid through the impeller per unit head and $N_1$ is the impeller speed per unit head, comprising the steps of:
  detecting the removal of load from the turbine and in response to detecting the load removal, closing the wicket gates upon removal of load from the pump-turbine to reduce $Q_1$ and approach the S-section without completely closing the wicket gates;

thereafter detecting when the pump-turbine is operating within the S-section so that the discharge per unit head $Q_1$ is decreasing and discontinuing said step of closing when $Q_1$ is decreasing; and thereafter detecting when the discharge per unit head $Q_1$ is increasing within the S-section and closing the wicket gates in the S-section when the discharge per unit head $Q_1$ is increasing.

49. The method of claim 48, wherein the turbine speed and the lapsed time is detected, and said step of discontinuing is conducted when the impeller speed with respect to time satisfies both of the relationships that $dN/dt < 0$ and $d^2N/dt^2 < 0$.

50. The method of claim 48, wherein both said steps of discontinuing and last mentioned closing are conducted when the turbine is operating below its no load discharge line.

51. The method of claim 48, wherein the turbine has a penstock providing fluid under pressure to the wicket gates, further comprising the steps of:

detecting the hydraulic pressure P within the penstock;

detecting the speed of rotation N of the impeller; and conducting said last mentioned closing step when $dP/dt < 0$, and $dN/dt < 0$, wherein t is time.

52. The method of claim 48, further including the steps of:

detecting the speed of rotation of the impeller N;

detecting the torque T produced by turbine operation; and conducting said step of discontinuing when $dT/dt < 0$ and $dN/dt < 0$.

53. The method of claim 48, further comprising the steps of:

rapidly closing the wicket gates when it is detected that the ratio $\partial Q_1/\partial N_1$ changes from a positive value to a negative value indicating that operation within the S-section has terminated.

54. A method of controlling the wicket gates of a pump-turbine to prevent abnormal pressure rises when load carried by the pump-turbine is removed during the turbine operation, with respect to a turbine having wicket gates closeable and openable to control the flow of fluid through the turbine impeller under the control of a regular controller, such as a speed governor, and having an S-section of its performance as a turbine defined by $\partial Q_1/\partial N_1 > 0$, wherein $Q_1$ is the discharge fluid through the impeller per unit head and $N_1$ is the impeller speed per unit head, comprising the steps of:

upon removal of load from the pump-turbine, reducing $Q_1$ and approaching the S-section with the wicket gates being closed under control from the regular controller;

thereafter putting the wicket gates under an overriding control within the S-section which allows only closing speed substantially stopping and very slow closing or opening signals from said regular controller and, for any faster closing signals from said regular controller outside said closing speed range, gives an overriding signal for substantially holding at the current wicket gate position; and thereafter closing the wicket gates.

55. The method of claim 54, including the further steps of detecting when the pump-turbine is operating within the S-section so that the discharge per unit head $Q_1$ is decreasing and conducting said overriding control when $Q_1$ is decreasing.

56. The method of claim 55, further including the step of detecting when the discharge per unit head $Q_1$ is increasing within the S-section and conducting said last mentioned step of closing in the S-section when the discharge per unit head $Q_1$ is increasing.

57. The method of claim 54, wherein the turbine impeller speed N is detected, and said overriding control is conducted when the impeller speed with respect to time satisfies both of the relationships that $dN/dt < 0$ and $d^2N/dt^2 < 0$, wherein t is time.

58. The method of claim 57, further including the step of detecting when the discharge per unit head $Q_1$ is increasing within the S-section and conducting said last mentioned step of closing in the S-section when the discharge per unit head $Q_1$ is increasing.

59. The method of claim 54, further including the step of detecting when the discharge per unit head $Q_1$ is increasing within the S-section and conducting said last mentioned step of closing in the S-section when the discharge per unit head $Q_1$ is increasing.

60. The method of claim 54, wherein the turbine further has the characteristic of operating either above its no load discharge line or below its no load discharge line, and said overriding control and last mentioned closing are conducted in operation below said no load discharge line.

61. A method according to claim 54, wherein the turbine has a penstock providing fluid under pressure to the wicket gates, further comprising the steps of:

detecting the hydraulic pressure P within the penstock;

detecting the speed of rotation N of the impeller; and conducting said closing step when $dP/dt < 0$, and $(dN/dt) < 0$, wherein t is time.

62. A method according to claim 54, further including the steps of:

detecting the speed of rotation of the impeller N;

detecting the torque T produced by turbine operation; and conducting said overriding control when $dT/dt < 0$ and $dN/dt < 0$.

63. The method of claim 54, further comprising the steps of:

rapidly closing the wicket gates when it is detected that the ratio $\partial Q_1/\partial N_1$ changes from a positive value to a negative value indicating that operation within the S-section has terminated.

64. The method of claim 54, wherein the turbine has a penstock providing fluid under pressure to the wicket gates, further comprising the steps of:

detecting the hydraulic pressure P within the penstock;

detecting the speed of rotation N of the impeller; and conducting said overriding control when $dP/dt > 0$, and $(dN/dt) < 0$, wherein t is time.

65. The method of claim 64, wherein the turbine has a penstock providing fluid under pressure to the wicket gates, further comprising the steps of:

detecting the hydraulic pressure P within the penstock;

detecting the speed of rotation N of the impeller; and conducting said closing step when $dP/dt < 0$, and $(dN/dt) < 0$, wherein t is time.

66. The method of claim 54, including discontinuing said overriding control of the wicket gates when $\partial Q_1/\partial N_1 < 0$.

67. The method of claim 66, including the further steps of detecting when the pump-turbine is operating within the S-section so that the discharge per unit head $Q_1$ is decreasing and conducting said overriding control when $Q_1$ is decreasing.

68. The method of claim 54, wherein said step of reducing partially closes the wicket gates.

69. The method of claim 68, including the further steps of detecting when the pump-turbine is operating within the S-section so that the discharge per unit head $Q_1$ is decreasing and conducting said overriding control when $Q_1$ is decreasing.

70. The method of claim 69, further including the step of detecting when the discharge per unit head $Q_1$ is increasing within the S-section and conducting said last mentioned step of closing in the S-section when the discharge per unit head $Q_1$ is increasing.

71. The method of claim 68, wherein the turbine impeller speed N is detected, and said overriding control is conducted when the impeller speed with respect to time satisfies both of the relationships that $dN/dt < 0$ and $d^2N/dt^2 < 0$, wherein t is time.

72. The method of claim 71, further including the step of detecting when the discharge per unit head $Q_1$ is increasing within the S-section and conducting said last mentioned step of closing in the S-section when the discharge per unit head $Q_1$ is increasing.

73. The method of claim 68, further including the step of detecting when the discharge per unit head $Q_1$ is increasing within the S-section and conducting said last mentioned step of closing in the S-section when the discharge per unit head $Q_1$ is increasing.

74. The method of claim 68, wherein the turbine further has the characteristic of operating either above its no load discharge line or below its no load discharge line, and said overriding control and last mentioned closing are conducted in operation below said no load discharge line.

75. The method of claim 68, wherein the turbine has a penstock providing fluid under pressure to the wicket gates, further comprising the steps of:
detecting the hydraulic pressure P within the penstock;
detecting the speed of rotation N of the impeller; and
conducting said closing step when $dP/dt < 0$, and $(dN/dt) < 0$ wherein t is time.

76. The method of claim 68, further including the steps of:
detecting the speed of rotation of the impeller N;
detecting the torque T produced by turbine operation; and
conducting said overriding control when $dT/dt < 0$ and $dN/dt < 0$.

77. The method of claim 68, further comprising the steps of:
rapidly closing the wicket gates when it is detected that the ratio $\partial Q_1/\partial N_1$ changes from a positive value to a negative value indicating that operation within the S-section has terminated.

78. The method of claim 68, wherein the turbine has a penstock providing fluid under pressure to the wicket gates, further comprising the steps of:
detecting the hydraulic pressure P within the penstock;
detecting the speed of rotation N of the impeller; and
conducting said overriding control when $dP/dt > 0$, and $(dN/dt) < 0$, wherein t is time.

79. The method of claim 78, wherein the turbine has a penstock providing fluid under pressure to the wicket gates, further comprising the steps of:
detecting the hydraulic pressure P within the penstock;
detecting the speed of rotation N of the impeller; and
conducting said closing step when $dP/dt < 0$, and $(dN/dt) < 0$, wherein t is time.

80. The method of claim 68, discontinuing said overriding control of the wicket gates when $\partial Q_1/\partial N_1 < 0$.

81. The method of claim 80, including the further steps of detecting when the pump-turbine is operating within the S-section so that the discharge per unit head $Q_1$ is decreasing and conducting said overriding control when $Q_1$ is decreasing.

82. The method of claim 71, wherein the turbine further has the characteristic of operating either above its no load discharge line or below its no load discharge line, and said overriding control and last mentioned closing are conducted in operation below said no load discharge line.

83. The method of claim 82, wherein the turbine has a penstock providing fluid under pressure to the wicket gates, further comprising the steps of:
detecting the hydraulic pressure P within the penstock;
detecting the speed of rotation N of the impeller; and
conducting said closing step when $dP/dt < 0$, and $(dN/dt) < 0$, wherein t is time.

84. The method of claim 82, further comprising the steps of:
rapidly closing the wicket gates when it is detected that the ratio $dQ_1/dN_1$ changes from a positive value to a negative value indicating that operation within the S-section has terminated.

85. The method of claim 82, including discontinuing said overriding control of the wicket gates when $\partial Q_1/\partial N_1 < 0$.

86. The method of claim 68, wherein said step of closing closes the wicket gates at a rate at least as great as said step of reducing.

87. The method of claim 86, including the further steps of detecting when the pump-turbine is operating within the S-section so that the discharge per unit head $Q_1$ is decreasing and conducting said overriding control when $Q_1$ is decreasing.

88. The method of claim 87, further including the step of detecting when the discharge per unit head $Q_1$ is increasing within the S-section and conducting said last mentioned step of closing in the S-section when the discharge per unit head $Q_1$ is increasing.

89. The method of claim 86, wherein the turbine impeller speed N is detected, and said overriding control is conducted when the impeller speed with respect to time satisfies both of the relationships that $dN/dt < 0$ and $d^2N/dt^2 < 0$, wherein t is time.

90. The method of claim 89, further including the step of detecting when the discharge per unit head $Q_1$ is increasing within the S-section and conducting said last mentioned step of closing in the S-section when the discharge per unit head $Q_1$ is increasing.

91. The method of claim 86, further including the step of detecting when the discharge per unit head $Q_1$ is increasing within the S-section and conducting said last mentioned step of closing in the S-section when the discharge per unit head $Q_1$ is increasing.

92. The method of claim 86, wherein the turbine further has the characteristic of operating either above its no load discharge line or below its no load discharge line, and said overriding control and last mentioned closing are conducted in operation below said no load discharge line.

93. The method of claim 86, wherein the turbine has a penstock providing fluid under pressure to the wicket gates, further comprising the steps of:
detecting the hydraulic pressure P within the penstock;
detecting the speed of rotation N of the impeller; and
conducting said closing step when $dP/dt<0$, and $(dN/dt)<0$, wherein t is time.

94. The method of claim 86, further including the steps of:
detecting the speed of rotation of the impeller N;
detecting the torque T produced by turbine operation; and
conducting said overriding control when $dT/dt<0$ and $dN/dt<0$.

95. The method of claim 86, further comprising the steps of:
rapidly closing the wicket gates when it is detected that the ratio $\partial Q_1/\partial N_1$ changes from a positive value to a negative value indicating that operation within the S-section has terminated.

96. The method of claim 86, wherein the turbine has a penstock providing fluid under pressure to the wicket gates, further comprising the steps of:
detecting the hydraulic pressure P within the penstock;
detecting the speed of rotation N of the impeller; and
conducting said overriding control when $dP/dt>0$, and $(dN/dt)<0$, wherein t is time.

97. The method of claim 96, wherein the turbine has a penstock providing fluid under pressure to the wicket gates, further comprising the steps of:
detecting the hydraulic pressure p within the penstock;
detecting the speed of rotation N of the impeller; and
conducting said closing step when $dP/dt<0$, and $(dN/dt)<0$, wherein t is time.

98. In a method of controlling wicket gates of a pump-turbine of the type showing during turbine operation the performance that discharge per unit head $(Q_1)$ and speed per unit head $(N_1)$ satisfy the relationship, $\partial Q_1/\partial N_1>0$, comprising the steps of:
slowly opening said wicket gates upon removal of load from said pump-turbine;
temporarily increasing the opening speed of said wicket gates during said slowly opening step when the pump-turbine is operated tracing the S-section in the $Q_1$-reducing direction ($dQ_1/dt$ is negative).

99. A method of controlling wicket gates as set forth in claim 98, wherein said opening speed increasing step is carried out when a fixed time period has elapsed after the removal of load.

100. A method of controlling wicket gates as set forth in claim 98, wherein said opening speed increasing step is carried out when number of rotation (N) of said pump-turbine and time lapse (t) after the removal of load satisfy the relationships, $dN/dt<0$ and $d^2N/dt^2<0$.

101. A method of controlling wicket gates as set forth in claim 4, wherein said wicket gates temporarily opening step is engaged when number of rotation of said pump-turbine attains a maximum value.

102. A method of controlling wicket gates of a pump-turbine of the type which has in the turbine operation area an S-section where discharge per unit head $(Q_1)$ and speed per unit head $(N_1)$ satisfy the relationship $\partial Q_1/\partial N_1>0$, comprising the steps of:
detecting a condition where said pump-turbine is operating tracing said S-section in the $Q_1$-reducing direction; and
when said detecting step detects said condition, putting said wicket gates under an overriding control which allows only opening signals of a faster rate than a fixed rate from a regular controller (such as a speed-governor) and, for any slower rate, opening signals or closing signals from said regular controller gives an overriding opening signal of faster than or equal to said fixed rate.

103. A method of controlling wicket gates of a pump-turbine of the type which has in the turbine operation area an S-section where discharge per unit head $(Q_1)$ and speed per unit head $(N_1)$ satisfy the relationship $\partial Q_1/\partial N_1>0$, comprising the steps of:
detecting a condition where said pump-turbine is operating tracing said S-section in the $Q_1$-increasing direction; and
when said detecting step detects said condition, putting said wicket gates under an overriding control which allows only closing signals of faster rate than a fixed rate from a regular controller (such as a speed-governor) and, for any slower rate closing signals or opening signals from said regular controller gives an overriding closing signal of faster than or equal to said fixed rate.

104. A method of controlling wicket gates as set forth in claim 102, further comprising the steps of:
detecting a second condition where said pump-turbine is operating tracing said S-section in the $Q_1$-increasing direction, and when said detecting step detects said second condition, putting said wicket gates under a second overriding control which allows only closing signals of faster rate than a second fixed rate from said regular controller and, for any slower rate closing signals or opening signals from said regular controller, gives an overriding closing signal of faster than or equal to said second fixed rate.

105. A method of controlling wicket gates of a pump-turbine of the type which has in the turbine operation area an S-section where discharge per unit head $(Q_1)$ and speed per unit head $(N_1)$ satisfy the relationship $\partial Q_1/\partial N_1>0$, comprising the steps of:
detecting a condition where said pump-turbine is operating tracing said S-section in the $Q_1$-reducing direction,
and
when said detecting step detects said condition, putting said wicket gates under an overriding control which allows only substantially stopping or opening signals from a regular controller (such as a speed-governor) and, for any faster closing signals from said regular controller, gives an overriding signal for substantially holding at the current wicket gate position.

106. A method of controlling wicket gates of a pump-turbine of the type which has in the turbine operation area an S-section where discharge per unit head ($Q_1$) and speed per unit head ($N_1$) satisfy the relationship, $\partial Q_1/\partial N_1 > 0$, comprising the steps of:

detecting a second condition where said pump-turbine is operating tracing said S-section in the $Q_1$-increasing direction, and when said detecting step detects said second condition, putting said wicket gates under an overriding control which allows only substantially stopping or closing signals from a regular controller (such as a speed-governor) and, for any faster opening signals from said regular controller, gives an overriding signal for substantially holding at the current wicket gate position.

107. A method of controlling wicket gates as set forth in claim 106, further comprising the steps of:

detecting a second condition where said pump-turbine is operating tracing said S-section in the $Q_1$-increasing direction, and when said detecting step detects said second condition, putting said wicket gates under a second overriding control which allows only substantially stopping or closing signals from said regular controller and, for any faster opening signals from said regular controller, gives a second overriding signal for substantially holding at the current wicket gate position.

108. A method of controlling wicket gates as set forth in claim 102, further comprising the steps of:

detecting a second condition where said pump-turbine is operating tracing said S-section in the $Q_1$-increasing direction, and when said detecting step detects said second condition, putting said wicket gates under a second overriding control which allows only substantially stopping or closing signals from said regular controller and, for any faster opening signals from said regular controller, gives a second overriding signal for substantially holding at the current wicket gate position.

109. A method of controlling wicket gates as set forth in claim 105, further comprising the steps of:

detecting a second condition where said pump-turbine is operating tracing said S-section in the $Q_1$-increasing direction, and when said detecting step detects said second condition, putting said wicket gates under a second overriding control which allows only closing signals of faster rate than a fixed rate from said regular controller and, for any slower rate closing signals or opening signals from said regular controller, gives an overriding closing signal of faster than or equal to said fixed rate.

110. A method of controlling wicket gates as set forth in claim 102, 104 or 108, wherein said first overriding control for opening is carried out when it is detected that both number of rotation (N) of said pump-turbine and hydraulic flow rate (Q) through said pump-turbine reduce with the lapse of time.

111. A method of controlling wicket gates as set forth in claim 102, 104 or 108, wherein said first overriding control for opening is carried out when it is detected that, with the lapse of time, number of rotation (N) of said pump-turbine reduces and hydraulic pressure (P) in a penstock increases.

112. A method of controlling wicket gates as set forth in claim 102, 104 or 108, wherein said first overriding control for opening is carried out when it is detected that both pump-turbine torque (T) and number of rotation (N) of said pump-turbine reduce with the lapse of time.

113. A method of controlling wicket gates as set forth in claim 102, 104 or 108, wherein said first overriding control for opening is carried out when it is detected that number of rotation (N) of said pump-turbine and time lapse (t) satisfy the relationships, $dN/dt < 0$ and $d^2N/dt^2 < 0$.

114. A method of controlling wicket gates as set forth in claim 102, 104 or 109, wherein said overriding control for closing is carried out when it is detected that hydraulic flow rate (Q) through said pump-turbine increases sharply with the lapse of time.

115. A method of controlling wicket gates as set forth in claim 102, 104 or 109, wherein said overriding control for closing is carried out when it is detected that, with the lapse of time, hydraulic pressure (P) in a penstock sharply reduces.

116. A method of controlling wicket gates as set forth in claim 98, further comprising the step of closing said wicket gates when it is detected that said pump-turbine operation tracing said S-section in the $Q_1$-reducing direction is terminated.

117. A method of controlling wicket gates as set forth in claim 105, 107 or 109, wherein said first overriding control is carried out when it is detected that both number of rotation (N) of said pump-turbine and hydraulic flow rate (Q) through said pump-turbine reduce with the lapse of time.

118. A method of controlling wicket gates as set forth in claim 105, 107 or 109, wherein said first overriding control is carried out when it is detected that, with the lapse of time, number of rotation (N) of said pump-turbine reduces and hydraulic pressure (P) in a penstock increases.

119. A method of controlling wicket gates as set forth in claim 105, 107 or 109, wherein said first overriding control is carried out when it is detected that both the pump-turbine torque (T) and number of rotation (N) of said pump-turbine reduce with the lapse of time.

120. A method of controlling wicket gates as set forth in claim 105, 107 or 109, wherein said first overriding control is carried out when it is detected that number of rotation (N) of said pump-turbine and time lapse (t) satisfy the relationships, $dN/dt < 0$ and $d^2N/dt^2 < 0$.

121. A method of controlling wicket gates as set forth in claim 102, 103 or 104, wherein said wicket gates closing and opening steps are carried out by forcibly controlling a hydraulic distributing valve of servomotors for the wicket gates.

122. In a method of controlling wicket gates of a pump-turbine upon removal of load from said pump-turbine, said pump-turbine being of the type having in the turbine operation area an S-section where discharge per unit head ($Q_1$) and speed per unit head ($N_1$) satisfy the relationship, $\partial Q_1/\partial N_1 > 0$, the improvement which comprises the steps of slowly closing said wicket gates when the ratio ($\partial Q_1/\partial N_1$) of variation of the discharge per unit head to the speed per unit head is reduced than a predetermined negative value or turns to positive, continuing the slow closure of said wicket gates while said pump-turbine operates tracing said S-section, and rapidly closing said wicket gates as soon as the ratio, $\partial Q_1/\partial N_1$, is once reversed from a positive value to a negative value, out of said S-section.

123. In a method of controlling wicket gates of a pump-turbine upon removal of load from said pump-turbine, said pump-turbine being of the type having in the turbine operation area an S-section where discharge per unit head ($Q_1$) and speed per unit head ($N_1$) satisfy the relationship, $\partial Q_1/\partial N_1>0$, the improvement which comprises the steps of forcibly opening said wicket gates when the ratio ($\partial Q_1/\partial N_1$) of variation of the discharge per unit head to the speed per unit head is reduced than a predetermined negative value or turns to positive, continuing the forcible opening of said wicket gates while said pump-turbine operates tracing said S-section, and rapidly closing said wicket gates as soon as the ratio, $\partial Q_1/\partial N_1$, is once reversed from a positive value to a negative value, out of said S-section.

124. In a method of controlling wicket gates of a pump-turbine of the type which has in the turbine operation area an S-section where discharge per unit head ($Q_1$) and speed per unit head ($N_1$) satisfy the relationship, $\partial Q_1/\partial N_1>0$, the improvement which comprises the steps of opening said wicket gates when the turbine operation of said pump-turbine is effected in the $Q_1$-reducing direction in the S-section upon removal of load from said pump-turbine, and, when said pump-turbine operates outside said S-section, or tracing the S-section in the $Q_1$-increasing direction, closing said wicket gates as rapidly as possible under condition that the hydraulic pressure variation caused by the rapid closure of said wicket gates becomes substantially equal to the hydraulic pressure variation caused in the S-section.

* * * * *